US008865282B2

(12) United States Patent
Hsu

(10) Patent No.: US 8,865,282 B2
(45) Date of Patent: Oct. 21, 2014

(54) PROTECTIVE COVER PLATE

(71) Applicants: Tsung-Fen Wang, Taipei (TW); Cheng-Chung Hsu, Taoyuan County (TW); Chien-Liang Liu, Taoyuan County (TW); Chun-Sheng Lin, Taipei (TW); Shiu Yang Technology Co., Ltd, Taoyuan (TW); Yo Want Technology Co., Ltd, Taoyuan (TW)

(72) Inventor: Cheng-Chung Hsu, Taoyuan (TW)

(73) Assignees: Tsung-Fen Wang, Taipei (TW); Cheng-Chung Hsu, Taoyuan County (TW); Chien-Liang Liu, Taoyuan County (TW); Chun-Sheng Lin, Taipei (TW); Shiu Yang Technology Co., Ltd, Taoyuan (TW); Yo Want Technology Co., Ltd, Taoyuan (TW)

( * ) Notice: Subject to any disclaimer, the term of this patent is extended or adjusted under 35 U.S.C. 154(b) by 0 days.

(21) Appl. No.: 14/055,305

(22) Filed: Oct. 16, 2013

(65) Prior Publication Data
US 2014/0287203 A1  Sep. 25, 2014

(30) Foreign Application Priority Data

Mar. 21, 2013 (TW) .............................. 102205238 U

(51) Int. Cl.
| B32B 9/00 | (2006.01) |
|---|---|
| B32B 33/00 | (2006.01) |
| B32B 7/12 | (2006.01) |
| B32B 38/14 | (2006.01) |
| B32B 7/04 | (2006.01) |
| B32B 7/06 | (2006.01) |
| B32B 3/10 | (2006.01) |
| B32B 27/36 | (2006.01) |
| B32B 7/14 | (2006.01) |
| B32B 17/10 | (2006.01) |
| C09J 7/02 | (2006.01) |

(52) U.S. Cl.
CPC . B32B 7/12 (2013.01); B32B 38/14 (2013.01); B32B 7/045 (2013.01); B32B 7/06 (2013.01); B32B 3/10 (2013.01); B32B 27/36 (2013.01); C09J 7/02 (2013.01); B32B 7/14 (2013.01); B32B 17/10018 (2013.01); C09J 7/0207 (2013.01); B32B 2307/412 (2013.01)
USPC ....... 428/40.1; 428/41.5; 428/41.7; 428/41.8; 428/42.1; 428/42.2; 428/174; 428/188; 428/195.1; 428/201; 428/203; 428/480; 428/500

(58) Field of Classification Search
CPC .............. B32B 7/12; B32B 7/06; B32B 3/10; B32B 7/14; B32B 7/045; B32B 17/10018; B32B 2307/412; B32B 38/14; B32B 27/36; C09J 7/02; C09J 7/0207
USPC ........... 428/40.1, 41.5, 41.7, 41.8, 42.1, 42.2, 428/174, 188, 195.1, 201, 203, 480, 500
See application file for complete search history.

(56) References Cited

U.S. PATENT DOCUMENTS

| 2002/0114934 A1* | 8/2002 | Liu et al. ........................ 428/212 |
|---|---|---|
| 2009/0186181 A1* | 7/2009 | Mase ........................... 428/40.1 |

(Continued)

*Primary Examiner* — Betelhem Shewareged
(74) *Attorney, Agent, or Firm* — Jackson IPG PLLC

(57) ABSTRACT

A protective cover plate mainly comprises a substrate, a printing layer, an ultraviolet layer and an adhesive layer, wherein the printing layer is disposed at a side surface of the substrate. The printing layer is formed with at least a pattern. The pattern protrudes the substrate to form a segmental difference surface. The ultraviolet layer is disposed to another side surface of the printing layer relative to the substrate, and the ultraviolet layer is disposed with at least a filling portion. The filling portion can be relatively located near the pattern to fill the segmental difference surface of the pattern to flat the surface. A side of the ultraviolet layer is disposed with the adhesive layer. The plate can be adhered to the article by utilizing the adhesive layer. The protective cover plate does not only have flat appearance but also achieves dustproof and dirt prevention efficacies.

9 Claims, 7 Drawing Sheets

(56) References Cited

U.S. PATENT DOCUMENTS

| | | |
|---|---|---|
| 2012/0183712 A1* | 7/2012 | Leonhard et al. ............ 428/40.1 |
| 2013/0142981 A1* | 6/2013 | Huang ......................... 428/41.8 |
| 2013/0209752 A1* | 8/2013 | Wilson et al. ................. 428/188 |
| 2013/0215497 A1* | 8/2013 | Chan et al. .................... 359/350 |
| 2013/0316114 A1* | 11/2013 | Hwang ........................ 428/41.7 |

* cited by examiner

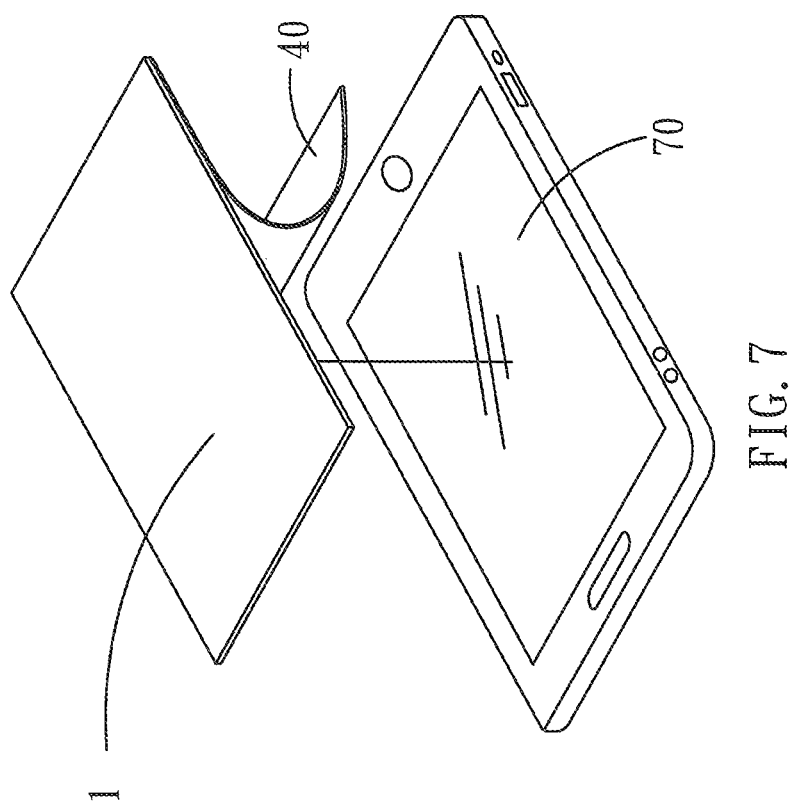

PROTECTIVE COVER PLATE

BACKGROUND OF THE INVENTION

1. Field of the Invention

The invention relates to a protective cover plate, and more particularly to the protective cover plate applied to a display of a portable electronic appliance so that not only it can achieve flattened appearance but also achieves dustproof and dirt prevention efficacies.

2. Description of the Related Art

Since digital information market is developed, 3C products' application grows up within very short time, and many 3C products uses touch panels to enhance operating ability and convenience. However, touch panel products may have scratches and liens after using it for a while. Consequently, these touch panels may cause blur and affect visual feeling, and the whole device is not beautiful any more. To overcome the foregoing problem, different kinds of protectors are provided to protect the touch panels.

A conventional protector only has dustproof function and lacks for scratch resistance feature. While manufacturing the conventional protector, a segmental difference surface may cause the recess and deformation of the protector due to the segmental difference surface generated by the printing. Once the protector is recessed and deformed, it may form a concave lens at optical effect. When light passes through it, the reflection is formed to generate interfered fringes. At this time, a user will see a plurality of circular fringes arranged at a concentric circle on the touch panel. The foregoing phenomenon is called Newton ring. Newton ring may interfere with the screen of the touch panel. The user will see worse visual effect on the screen while passing through the protector and cause uncomfortableness. Thus, current protectors may be required with more functions, and such functions are an important research issue.

Due to the foregoing shortcomings, an ideal and easy to use structure is not developed yet, the inventor(s) provides a novel protective cover plate having inventive step based upon his/her research to match the efficacy for current protectors, and not only the protector can achieve flattened appearance but also achieves dustproof and dirt prevention efficacies.

SUMMARY OF THE INVENTION

Therefore, upon the foregoing problems of prior art, it is an objective of the present invention to provide a protective cover plate capable of being applied to a display of a portable electronic appliance. It does not only flat the appearance of the protective cover plate but also achieves dustproof and dirt prevention efficacies.

To achieve the foregoing objective, the protective cover plate according to the invention mainly comprises a substrate, a printing layer, an ultraviolet layer and an adhesive layer, wherein the printing layer is disposed to a side surface of the substrate, and the printing layer is formed with at least a pattern. The pattern protrudes the substrate to form a segmental difference surface. The ultraviolet layer is disposed to another side surface of the printing layer relative to the substrate. The ultraviolet layer is disposed with at least a filling portion. The filling portion can be relatively located near the pattern to fill the segmental difference surface of the pattern, thereby flattening its surface. A side of the ultraviolet layer is disposed with the adhesive layer. The plate can be adhered to the article by using the adhesive layer. The protective cover plate does not only have flattened appearance but also achieves dustproof and dirt prevention efficacies.

BRIEF DESCRIPTION OF THE DRAWINGS

The detailed structure, operating principle and effects of the present invention will now be described in more details hereinafter with reference to the accompanying drawings that show various embodiments of the invention as follows.

FIG. 7 is an usage structural diagram of a protective cover plate according to the invention;

DETAILED DESCRIPTION OF THE PREFERRED EMBODIMENTS

The technical content of the present invention will become apparent by the detailed description of the following embodiments and the illustration of related drawings as follows.

Figure 1:
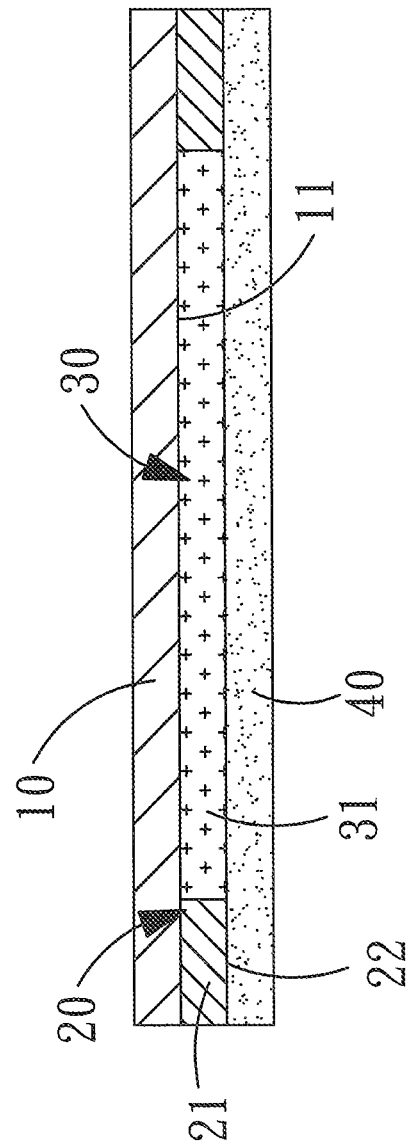
FIG. 1 is a structural diagram of a protective cover plate according to the invention.
Figure 2:
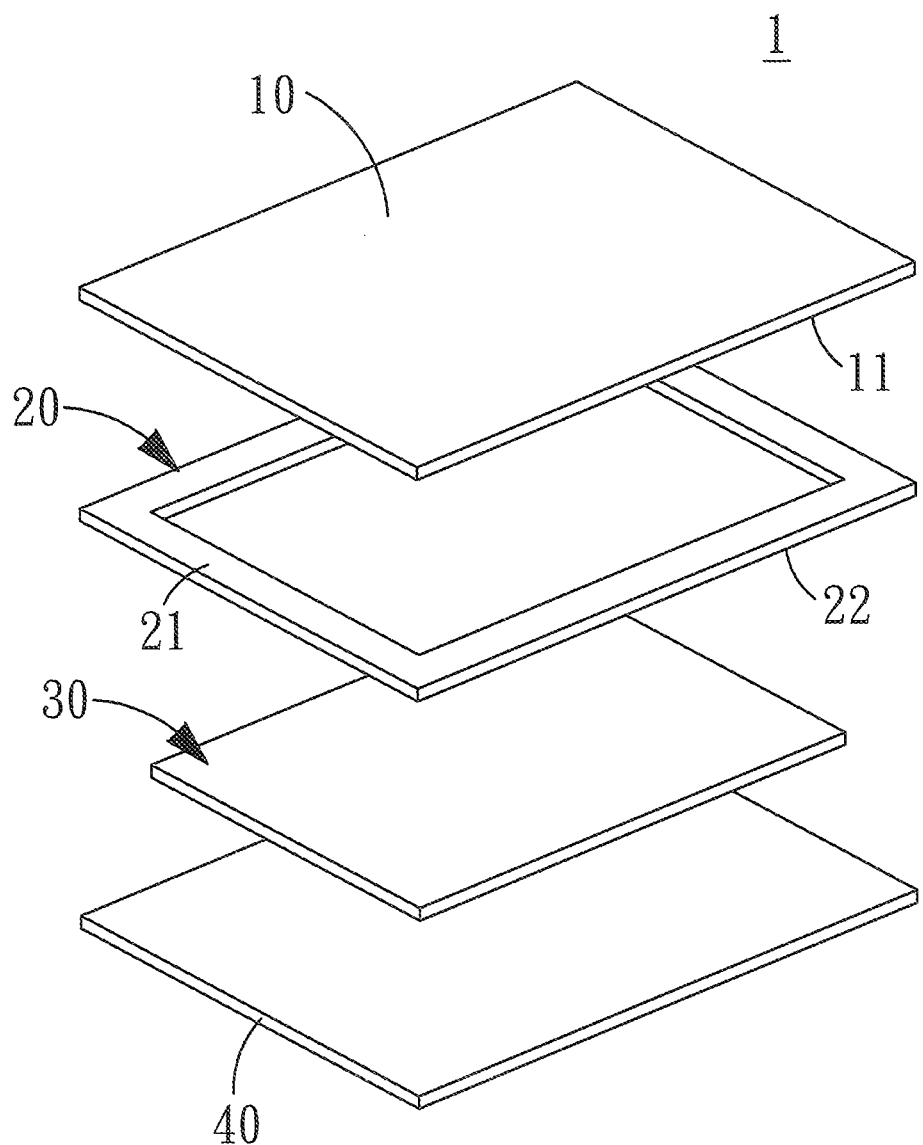
FIG. 2 is a structural decomposition drawing of a protective cover plate according to the invention.

With reference to FIG. 1 for a structural diagram of a protective cover plate according to an invention and FIG. 2 for a structural decomposition drawing of a protective cover plate according to the invention are depicted. The protective cover plate 1 according to the invention comprises a substrate 10, a printing layer 20, an ultraviolet layer 30 and an adhesive layer 40.

The substrate 10 has a flat surface 11 that can be made of PET or glass or acrylic material.

The printing layer 20 is disposed on the flat surface 11 at a side of the substrate 10, and the printing layer 20 is formed with at least a pattern 21. The pattern 21 protrudes the substrate 10 to form a segmental difference surface 22. In the embodiment shown in the figure, the pattern 21 of the printing layer 20 is at the edge side of the substrate 10 and formed with a frame pattern.

The ultraviolet layer 30 is disposed at another surface of the printing layer 20 relative to the substrate 10. The ultraviolet layer 30 can fill the segmental difference surface 22 of the printing layer 20, wherein the ultraviolet layer 30 is dispose with at least a filling portion 31 in the embodiment shown in the figure. The filling portion 31 can be relatively located near the pattern 21 to fill the segmental different surface 22, thereby flattening its surface.

The adhesive layer 40 is disposed to another side surface of the ultraviolet layer 30 corresponding to the substrate 10.

The ultraviolet layer 30 can be coated on a side surface of the printing layer 20 through coating manner. The ultraviolet layer 30 can fill the segmental difference surface 22 produced by printing the printing layer 20 to flatten its surface so that while manufacturing the protective cover plate according to the invention, phenomenon of Newton ring can be prevented from generating due to recess and deformation caused by the segmental difference surface 22 of the printing layer.

Figure 3:
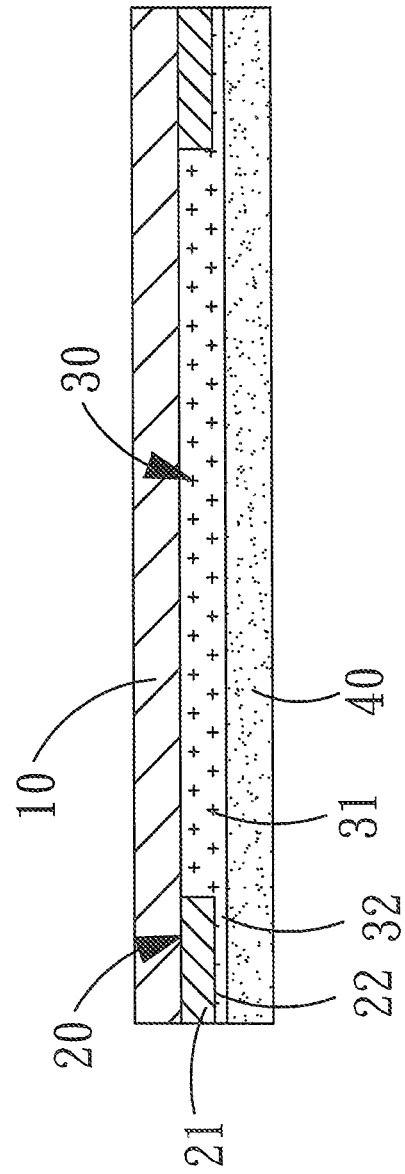
FIG. 3 is another structural diagram of a protective cover plate according to the invention.
Figure 4:
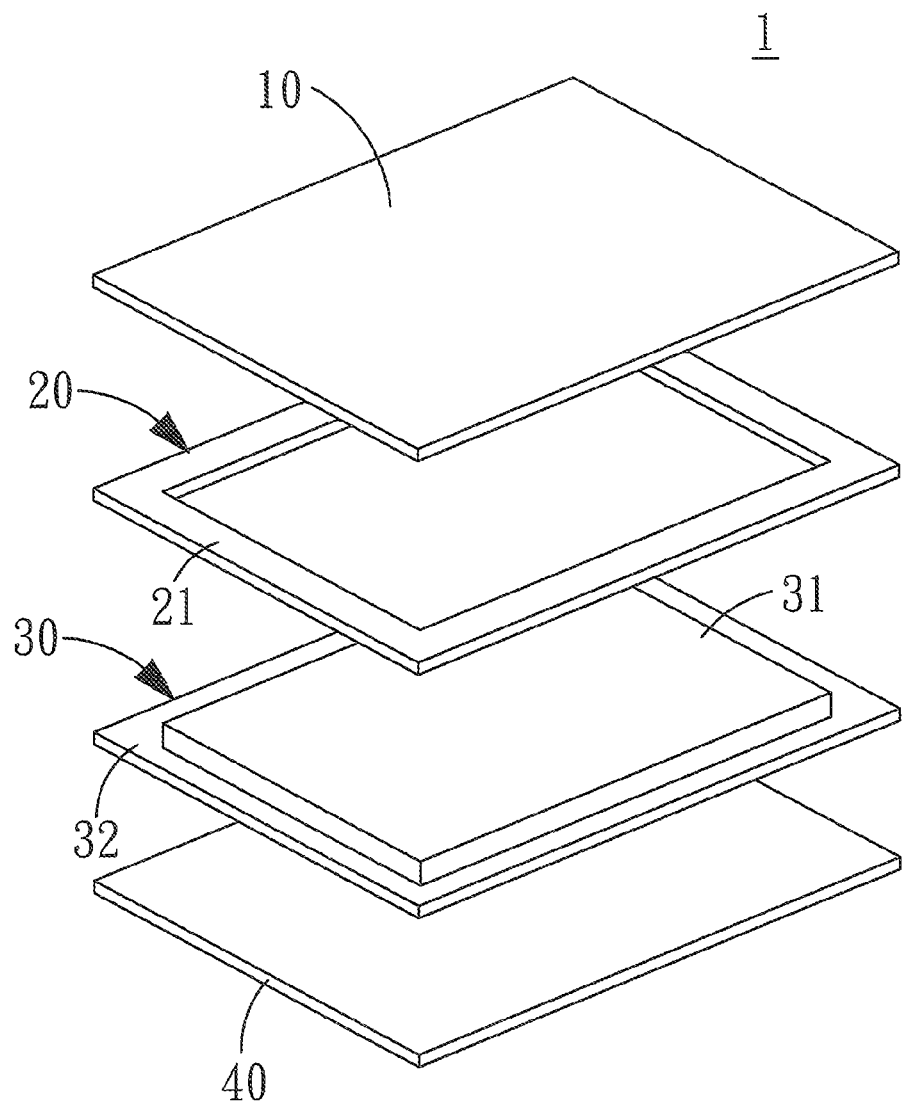
FIG. 4 is another structural decomposition drawing of a protective cover plate according to the invention.

Moreover, as shown in another embodiment of FIG. 3 and FIG. 4, the ultraviolet layer 30 can be formed with a base portion 32 covered on the pattern 21 to flatten the surface of the protective cover plate 1 to prevent the protective cover plate 1 from being recessed and deformed to generate phenomenon of Newton ring.

Figure 5:
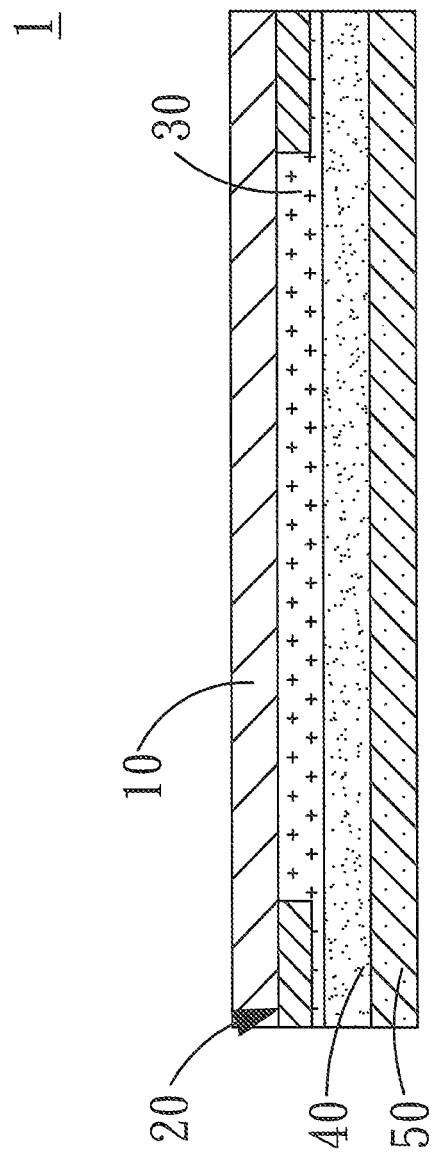
FIG. 5 is a further structural diagram of a protective cover plate according to the invention.

In addition, as shown in FIG. 5, the surface of the adhesive layer 40 can be disposed with a release layer 50.

Figure 6:
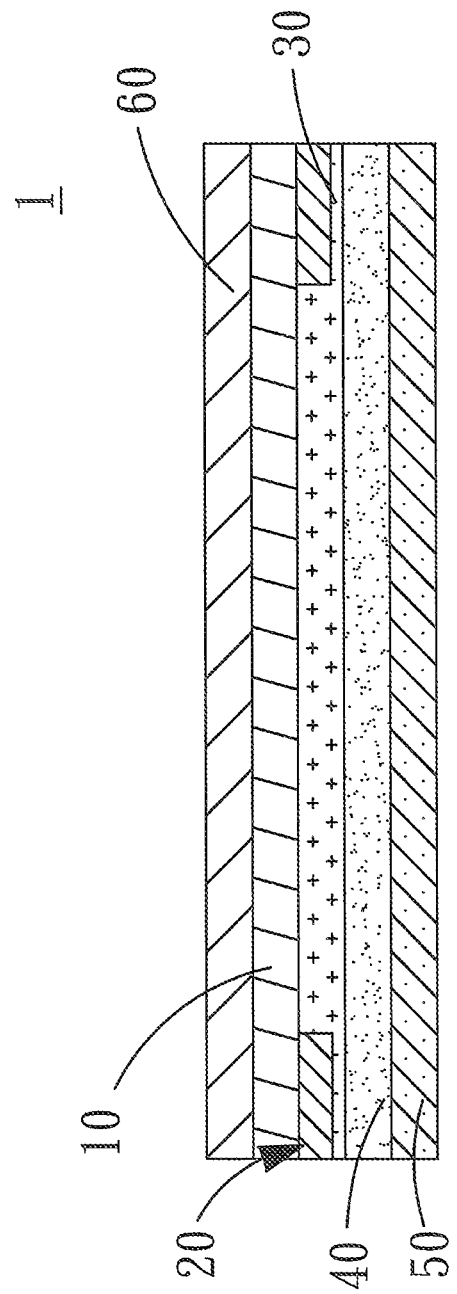
FIG. 6 is a further structural diagram of a protective cover plate according to the invention.

Further, as shown in FIG. 6, the surface of the substrate 10 can be attached with a glass carrier board 60. The glass carrier board 50 further increases the scratch resistance of the invention.

While applying displays 70 of portable electronic appliances (e.g. mobile phones, tablet computers, cameras, etc.), as shown in FIG. 7, the adhesive layer 40 is adhered to the display 70 after peeling off the release layer 50. Since the surface of the glass carrier board 60 is combined with the substrate 10 to resist scratches, the invention does not only flatten the appearance of the protective cover plate but also achieves dustproof and dirt prevention efficacies.

While the means of specific embodiments in a preferable protective cover plate according to the present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A protective cover plate comprising:
   a substrate;
   a printing layer disposed to a side surface of the substrate, the printing layer formed with at least a pattern, the pattern protruded the substrate to form a segmental difference surface;
   an ultraviolet layer disposed to another side surface of the printing layer relative to the substrate, the ultraviolet layer disposed at least a filling portion, the filling portion relatively located near the pattern to fill the segmental difference surface of the pattern to flatten its surface; and
   an adhesive layer disposed to a surface of the ultraviolet layer.

2. The protective cover plate of claim 1, wherein the ultraviolet layer is coated on a side surface of the printing layer through coating manner.

3. The protective cover plate of claim 1, wherein the substrate is polyethylene terephthalate material.

4. The protective cover plate of claim 1, wherein the substrate is a glass material.

5. The protective cover plate of claim 1, wherein the substrate is an acrylic material.

6. The protective cover plate of claim 1, wherein a surface of the adhesive layer is disposed with a release layer.

7. The protective cover plate of claim 1, wherein a surface of the substrate is adhered with a glass carrier board.

8. The protective cover plate of claim 1, wherein the ultraviolet layer is formed with a base portion covered on the pattern.

9. The protective cover plate of claim 1, wherein the pattern of the printing layer is at an edge side of the substrate and formed with a frame pattern.

* * * * *